(12) United States Patent
Tisbo

(10) Patent No.: US 6,895,634 B2
(45) Date of Patent: May 24, 2005

(54) WIRE MANAGEMENT GROMMET

(75) Inventor: Peter M. Tisbo, Barrington, IL (US)

(73) Assignee: Custom Plastics, Inc., Elk Grove Villa, IL (US)

( * ) Notice: Subject to any disclaimer, the term of this patent is extended or adjusted under 35 U.S.C. 154(b) by 0 days.

(21) Appl. No.: 10/687,406

(22) Filed: Oct. 14, 2003

(65) Prior Publication Data

US 2005/0076469 A1 Apr. 14, 2005

(51) Int. Cl.[7] ................................................. F16L 5/00
(52) U.S. Cl. .............................. 16/2.1; 16/2.2; 16/2.5; 174/153 G; 174/65 G; 174/152 G
(58) Field of Search ........................... 16/2.1, 2.2, 2.5; 174/153 G, 65 G, 152 G

(56) References Cited

U.S. PATENT DOCUMENTS

| | | | |
|---|---|---|---|
| 4,688,491 A | | 8/1987 | Herrera et al. |
| 4,730,363 A | | 3/1988 | Asbaghi |
| 5,567,916 A | * | 10/1996 | Napiorkowski et al. ... 174/153 G |
| 5,719,610 A | * | 2/1998 | Scheffelin ........................ 347/86 |
| 5,870,799 A | * | 2/1999 | Benda ............................ 16/2.1 |
| 6,393,658 B1 | | 5/2002 | Chong |
| 6,660,937 B1 | * | 12/2003 | MacLeod et al. ......... 174/65 G |

* cited by examiner

Primary Examiner—Suzanne Barrett
Assistant Examiner—Mark Williams
(74) Attorney, Agent, or Firm—McHale & Slavin, P.A.

(57) ABSTRACT

A wire management grommet includes an outer peripheral member and an inner perforate member. The outer peripheral member is constructed and arranged to frictionally engage a planar surface, usually a desk or tabletop. The outer peripheral member is formed from a first rigid material having sufficient mechanical stiffness for effective frictional engagement with the planar surface and the cooperating aperture. The inner perforate member is formed from a second flexible material and is overmolded using conventional injection molding techniques to the said outer peripheral member to form a unitary grommet. The second flexible material is chosen to have sufficient flexibility to permit passage of disparate cable combinations through the inner perforate member. The inner perforate member has a plurality of radially dispersed openings constructed and arranged for strain-free engagement of a plurality of cables so that the said inner perforate member returns to its original configuration after the cables have been inserted therethrough.

6 Claims, 1 Drawing Sheet

WIRE MANAGEMENT GROMMET

FIELD OF THE INVENTION

This invention is related to grommets for guiding electrical wiring through desk tops, or the like, and in particular to a grommet configured to position and organize a plurality of various types of wires within the grommet aperture, while providing tight closure thereof.

BACKGROUND OF THE INVENTION

Desktop workstations in an office environment are usually furnished with electrical devices such as personal computers, telephone equipment, power supply units, etc. which require cable connections to A/C outlets and/or telephone jacks. A typical computer system can include the CPU tower, monitors, a mouse, a keyboard, speakers, and any number of other peripheral devices, each including wire or cable connection means. To accommodate this multitude of wires and cables associated with workstations, modern office furniture often includes an aperture or bore in the desktop which allows the wires and cables to be fed through so that they are relatively unobtrusive. The aperture or bore in the furniture usually has a grommet inserted therein for both practical and esthetic reasons. The grommet protects the furniture from being damaged by abrasive wear caused by wires and cables on the edges of the aperture, while inexpensively providing a pleasing and finished appearance.

The most basic prior art grommet simply provides an open aperture in the desktop. Clearly, a drawback of having such an open aperture is that small objects can easily fall through. Some prior art grommets include a movable cover portion which allows the aperture to be sealed if it is not in use. Examples of this type of arrangement are seen in Herrara et al., U.S. Pat. No. 4,688,491, Asbaghi, U.S. Pat. No. 4,730,363 and Chong, U.S. Pat. No. 6,393,658. However, when the cover is open to receive wiring, a sizable opening can remain in the desktop because the wiring may not occupy the entire open area. It would therefore be desirable to provide a grommet having an opening which would conform to the dimensions of the wires inserted therethrough so that there is little open space.

Another drawback of some of the prior art designs including hinged cover portions is that the size of the wire-receiving opening is much smaller than the overall grommet, thus limiting the number of cables or wires which can be fed through. (This type of arrangement can be seen in U.S. Pat. Nos. 4,688,491 and 4,730,363.) Another problem with having a relatively small wire-receiving opening is that the cables may terminate in large connector elements (e.g. A/C plugs or serial port connectors) which are too large to fit through the opening.

An important consideration in cable and wire organization at computer workstations is that cables from different electronic devices may electronically interfere with one another when in physical contact or very close proximity. There is therefore a need in the art to provide a wire management device, preferably a desktop grommet, which serves to segregate the individual wires or cables.

Napiorski et al., U.S. Pat. No. 5,567,916, disclose a wire management having an outer peripheral portion and a central portion having different patterns adapted to receive cables. The central portion has a first side which is pre-scored into a star-like pattern to provide a plurality of wedges having radially disposed edges, and a second side which is pre-scored to provide a plurality of circular cut-outs. If the star-like pattern were punctured or torn to accommodate cables, the wedge portions would serve to somewhat close the opening around the cables, however, these wedge portions would tend to become randomly splayed around the cables, resulting in an untidy appearance. Also, if multiple cables were used, the star design would tend to position all the cables together in the center, which could result in electrical interference between the electronic devices. If the circles were punched out to provide the alternative mode of use, it would provide the desired amount of separation between the cables, however it would not be possible to insert larger connector elements through the grommet. Another disadvantage of this design is that once the punch-out portions are removed in the desired pattern for one particular set of cables, the grommet cannot be used again for another cable arrangement requiring a different punch-out configuration.

SUMMARY OF THE INVENTION

It is an objective of the invention to provide a wire management grommet for furniture which has an outer collar formed from a rigid material and an inner disk portion which is formed from a flexible material and overmolded to the outer collar to form a unitary wire management device.

It is another objective to provide a wire management grommet which includes both a rigid material portion and a flexible material portion which can be manufactured as an integral piece using conventional injection molding techniques.

It is a further objective of the invention to provide a wire management grommet which simultaneously accommodates a plurality of cables.

It is yet another objective to provide a wire management grommet which is configured to physically segregate individual cables or wires from one another to obviate the possibility of electrical interference.

It is still another objective to provide a wire management grommet having a flexible inner disk which can be temporarily distorted to allow the insertion of larger connector elements.

It is still another objective of the invention to provide a wire management grommet having a flexible inner disk having cut-out patterns defining a plurality of radially dispersed openings constructed and arranged for strain-free engagement of a plurality of cables.

It is still a further objective of the invention to provide a wire management grommet having a flexible inner disk having cut-out patterns which accommodate a plurality of cables while providing an effective cover for the aperture in which the grommet is seated.

It is yet a further objective of the invention to provide a wire management grommet which can be inexpensively manufactured.

In light of the above, the applicants propose a wire management grommet which can be seated in a cooperating bore or aperture in a desk or table top to provide effective distribution of plural disparate cable and wire combinations. The wire management grommet includes an outer peripheral member and an inner perforate member. The outer peripheral member is constructed and arranged to frictionally engage a planar surface, usually a desk or tabletop. The outer peripheral member is formed from a first rigid material having sufficient mechanical stiffness for effective frictional engagement with the planar surface and the cooperating aperture. The inner perforate member is formed from a second flexible material and is overmolded using conventional injection molding techniques to the said outer peripheral member to form a unitary grommet. The second flexible material is chosen to have sufficient flexibility to permit passage of disparate cable combinations through the inner perforate member.

The inner perforate member has a plurality of radially dispersed openings constructed and arranged for strain-free engagement of a plurality of cables so that the said inner perforate member returns to its original configuration after the cables have been inserted therethrough.

In the preferred embodiment, the outer peripheral member is formed from polypropylene and is made using conventional injection molding techniques. The inner perforate member is preferably formed from an injection-molded thermal plastic elastomer, such as Santoprene®. The inner perforate member 14 is overmolded onto the outer peripheral member using conventional overmolding techniques to provide a unitary grommet device.

DETAILED DESCRIPTION OF THE INVENTION

Figure 1:
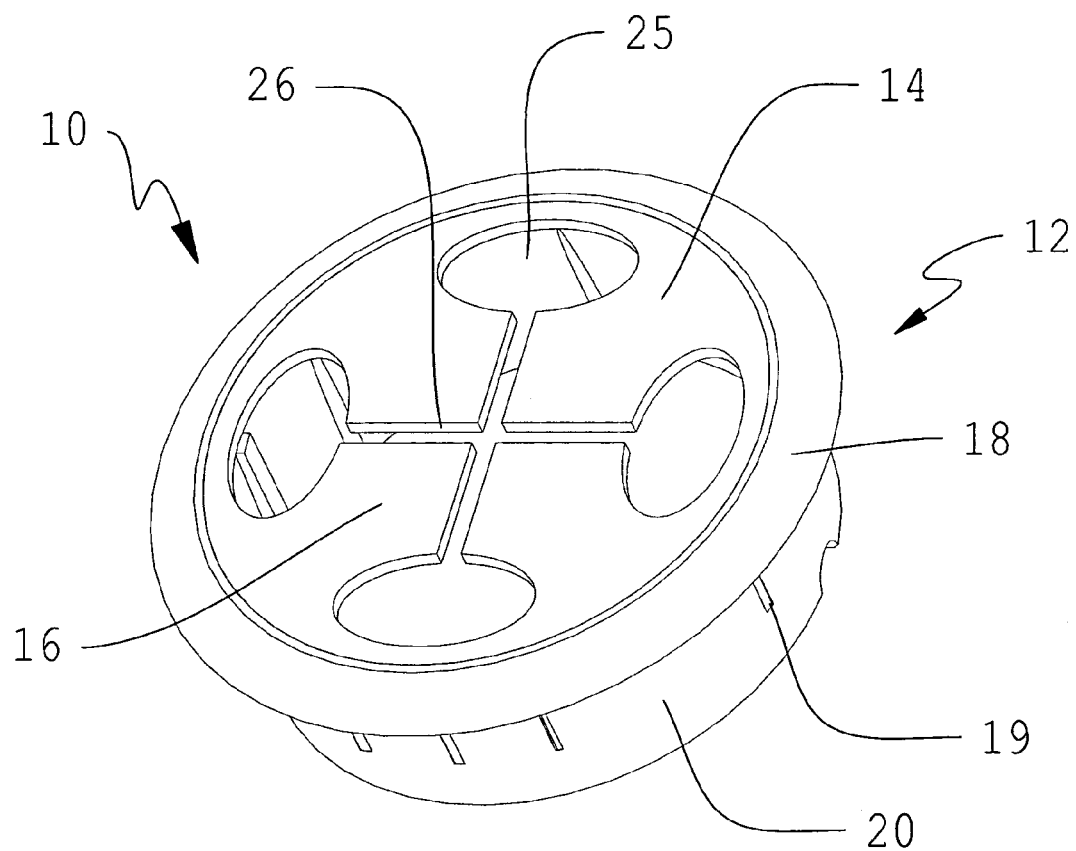
FIG. 1 is a perspective view of the wire management grommet according to a preferred embodiment of the invention.

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

FIG. 1 illustrates a wire management grommet 10 according to a preferred embodiment of the invention. In use, the wire management grommet 10 is seated in a cooperating bore or aperture in a desk or table top. The wire management grommet 10 of the invention provides effective distribution of plural disparate cable and wire combinations as are present, for example, at a computer workstation.

The wire management grommet 10 includes an outer peripheral member 12 and an inner perforate member 14. The outer peripheral member 12 is constructed and arranged to frictionally engage a planar surface, usually a desk or tabletop. The outer peripheral member 12 is formed from a first rigid material having sufficient mechanical stiffness for effective frictional engagement with the planar surface and the cooperating aperture. The inner perforate member 14 is formed from a second flexible material and is overmolded using conventional injection molding techniques to the said outer peripheral member 12 to form a unitary grommet 10. The second flexible material is chosen to have sufficient flexibility to permit passage of disparate cable combinations through the inner perforate member 14. The inner perforate member 14 has a plurality of radially dispersed openings generally referred to as 16 constructed and arranged for strain-free engagement of a plurality of cables so that the said inner perforate member 14 returns to its original configuration after the cables have been inserted therethrough.

The outer peripheral member 12 is formed as a collar and includes an annular shoulder portion 18 having a first larger diameter, and a cylindrical flange portion 20 which is contiguous to the annular shoulder portion 18 and having a second smaller diameter. The cylindrical flange portion 20 is dimensioned for close engagement with the cooperating aperture in the furniture, and can include a plurality of vertical rib members 19 for added frictional engagement.

The inner perforate member 14 can be formed as a disk which is in flush engagement with the annular shoulder portion 18. While the illustrated configuration of the openings referred to as 16 as described herein are considered to be an exemplary arrangement in accordance with the objectives of the invention, the openings can have any suitable configuration. As shown in FIG. 1, the inner perforate member includes a plurality of radially arranged apertures 25 proximate the annular should portion 18. The apertures 25 can have any suitable geometric configuration which would permit the insertion of a cable or wire through the apertures 25. A plurality of radial slits 26 extend through the inner perforate member 14 in one to one correspondence with the apertures 25 so that each radial slit 25 extends from said center point of the disk to said intersect the corresponding aperture 25. The illustrated embodiment includes four cable-receiving apertures 25, however any suitable number can be included as would be allowed by the size of the apertures and the overall dimensions of the wire management grommet 10.

In the preferred embodiment, the outer peripheral member 12 is comprised of polypropylene and is made using conventional injection molding techniques. The inner perforate member 14 is formed from an injection-molded thermal plastic elastomer, such as Santoprene® (polypropylene with 1 micron size particles of rubber). The inner perforate member 14 is then overmolded onto the outer peripheral member 12 in a conventional overmolding operation. The overmolding process allows the outer peripheral member 12 to become integral with the inner perforate member 24. A two shot injection molding process or a co-injection molding process could also be used. Other suitable injection-moldable materials can be used, however both the inner perforate member 14 and the outer peripheral member 12 are preferably formed from materials in the same family, preferably thermoplastics, so that they will bond to each other easily. However, other materials may be used, such as nylon, thermo-sets, silicones, polyester, etc.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A wire management grommet for effective distribution of plural disparate cable combinations comprising:

an outer peripheral member and an inner perforate member;

said outer peripheral member being constructed and arranged to frictionally engage a planar surface, said member being formed from a first material having sufficient mechanical stiffness for effective frictional engagement;

said inner perforate member being overmolded about said outer peripheral member to form a unitary wire management device, and being formed from a second material having sufficient flexibility to permit passage of disparate cable combinations;

said inner perforate member having a plurality of radially extending slits incorporated therein and extending therethrough, said slits constructed and arranged in one to one correspondence with a plurality of radially dispersed openings constructed and arranged for strain-free engagement of plural disparate cable combinations whereby each radial slit extends from a center point of said inner perforate member and intersects a corresponding radially dispersed opening;

whereby upon passage of said plural disparate combination of cables therethrough, said inner perforate member returns to its original configuration.

2. The wire management grommet of claim 1, wherein said first material is polypropylene.

3. The wire management grommet of claim 1, wherein said second material is a thermal elastic elastomer.

4. The wire management grommet of claim 1, wherein said first material is polypropylene.

5. The wire management grommet of claim 1, wherein said second material is a thermal elastic elastomer.

6. A wire management grommet for effective distribution of plural disparate cable combinations comprising:

an outer peripheral member and an inner perforate member;

said outer peripheral member being constructed and arranged to frictionally engage a planar surface, said member being formed from a first material having sufficient mechanical stiffness for effective frictional engagement;

said inner perforate member being overmolded about said outer peripheral member to form a unitary wire management device, and being formed from a second material having sufficient flexibility to permit passage of disparate cable combinations;

said inner perforate member being formed as a disk having a center point and an outer perimeter, said disk including a plurality of radially extending slits incorporated therein and extending therethrough, said slits constructed and arranged in one to one correspondence with a plurality of radially dispersed openings constructed and arranged for strain-free engagement of plural disparate cable combinations whereby each radial slit extends from said center point of said inner perforate member and intersects a corresponding radially dispersed opening;

whereby upon passage of said plural disparate combination of cables therethrough, said inner perforate member returns to its original configuration for strain-free engagement of plural disparate cable combinations.

* * * * *